Patented June 26, 1945

2,379,229

UNITED STATES PATENT OFFICE 2,379,229

LUBRICANTS AND METHOD OF MANUFACTURING THE SAME

Anthony H. Gleason, Westfield, N. J., assignor to Standard Oil Development Company, a corporation of Delaware No Drawing. Original application December 23, 1937, Serial No. 181,457. Divided and this application September 13, 1940, Serial No. 356,667

17 Claims. (Cl. 260—593)

The present invention relates to improved lubricating oils, specifically to oils of low pour point and further to substances having wax modifying properties which may be used to reduce the pour point of oils and to assist in the removal of waxy constituents from oils containing the same.

The present application is a division of application Serial No. 181,457, filed December 23, 1937, now Patent 2,238,638, which is a continuation in part of a prior application, Serial No. 618,473, filed June 21, 1932, now Patent 2,106,247.

It has been found that there are certain classes of substances which have the power of modifying crystal form or growth of the waxy constituents of lubricating oils so as to prevent solidification or congelation of the oil at its normal pour point. In this way an oil which normally becomes solid at say 30, or 40 or 50 or even 75° F. may be caused to remain liquid even as low as 15 or 10, or 0 or below, without removal of any of the wax therefrom. The present invention relates to a new class of substances which possesses both of the two enumerated properties to a more or less substantial degree.

The materials which form the basis of the present invention are condensation products of various compounds. The condensation is carried out with the assistance of aluminum chloride, zinc chloride, boron fluoride or other known condensation agents of this class and ordinarily at room temperatures such as 70 to 100° F. and generally not above say, 250 to 300° F., although the allowable limits may vary somewhat when different materials are used. If desired, solvents may be used during the condensation and for that purpose highly saturated kerosene or heavy naphtha, or other solvent may be used. If polymerization goes too far, insoluble materials of a rubbery character result which are, of course, undesirable. This may be prevented by limiting the time of reaction and by addition of saturated acids, esters, alcohols and the like to the reaction mixture.

The polymerization and condensation can also be conducted at higher temperatures in the presence of less active catalysts such as the active clays. The temperature should not be so high as to cause cracking and decomposition of the organic materials used.

In general, oxygen-containing aliphatic materials of the class of esters, ethers, acids, alcohols and ketones serve the present purpose. The substances of these classes which are used are those which contain relatively long hydrocarbon chains, say containing 10 or 12 carbon atoms at least, and preferably even more. The hydrocarbon chains are preferably straight or, at least, should be substantially so and should contain at least one reactive group in addition to the hydroxyl group. This reactive group may be olefinic as in the unsaturated alcohols such as oleyl or other unsaturated alcohols but the reactive group may also be a halogen for example chlorine as in the chlor-stearyl alcohol. The chlorinated or olefinic compounds may be used as such and the condensation is carried out in the same way as indicated above with the aluminum chloride type of catalysts at substantially the same temperatures mentioned. During this process a considerable amount of hydrochloric acid may be evolved. If preferred, the halogenated compound may be removed from the material prior to condensation in any known manner such as by application of heat, preferably in the presence of such material as barium chloride so as to split off hydrochloric acid leaving unsaturated material for condensation. Unsaturated or an already partially unsaturated material may be increased by this or by other suitable means before condensation.

As to the particular materials which may be used, acids of the type of stearic or palmitic are suitable, but since these are saturated they should be treated as above indicated either to render them unsaturated or to make their halogen derivatives. Generally speaking, straight chain saturated acids produced by the oxidation of paraffin wax by blowing with air, preferably in the presence of catalysts of the siccative type which range from $C_{10}$ to $C_{22}$ or more, may all be used, or mixtures may be used just as the natural fatty acids would be used. Naturally unsaturated acids may also be used such as oleic, erucic, elaidic or crotonic, and highly unsaturated acids can also be used such as linoleic, or their hydroxy derivatives such as naphtholic. Likewise, the acetylenic acids such as behenolic or stearolic are suitable.

The esters of all of these acids such as methyl, ethyl or propyl esters may be used, or even higher alkyl esters such as the drying or semi-drying oils, but the reaction of such materials is so sluggish that they are not nearly so desirable as the lower alkyl esters for the present purposes. In fact, the lower alkyl esters are probably more desirable than the acids themselves. Alcohols, ketones or ethers are useful for the present purpose exactly as the esters, and the substances of this class should contain straight hydrocarbon chains of, at least, 10 or 12 carbon atoms, as indicated above. If they are already unsaturated they may be used as such, as indicated before, but if saturated, they may be first halogenated or rendered unsaturated by the methods indicated above, or by similar suitable means.

The materials which have been listed above falling in the classes of acids, esters, alcohols, ethers, ketones and the like may be used alone, but it is preferable to carry out the condensation in the presence of a cyclic compound such as benzol or naphthalene or their hydrogenated or alkylated derivatives such as toluol or xylol or ethylnaphthalene, tetralin, hexalin, decalin, and the like. The presence of a hydroxy group in the cyclic substance is permissible although not specially desirable, as illustrated by the phenols and naphthols or cyclic alcohols such as cyclohexanol and the like. Nitrated aromatics can be used as well as amines such as aniline and naphthylamine. In addition to the cyclic compounds listed above, cyclic terpenes may also be used.

The condensation which is described above is more than a simple union of two molecules since very heavy polymers are sought to be produced and these materials are particularly desirable. The polymers which are to be used are those having molecular weights well above 600 and since the method produces materials of a series of molecular weights, it is difficult to say which are those responsible for this specific action. It has been found that materials of molecular weights of 1000 or 2000 and even higher are present. The crude reaction product may be purified by the ordinary methods known in the art; for example, by washing with water or alkali to remove traces of the aluminum chloride, or treated with sulphuric acid of a strength insufficient to carbonize or sulphonate, and the lighter fractions which do not possess pour depressing properties may be removed by distillation, preferably under vacuum up to a boiling point of say 475 to 575° F. (1 millimeter vacuum) so as to concentrate the valuable heavy polymers. Distillation with steam can also be used and care should be taken not to crack the product.

The exact structure of these materials after condensation is, of course, unknown but some of the oxygen is still present in the final product in addition to carbon and hydrogen and this can be demonstrated by analysis. If acids or esters are used the oxygen remains in an acidic form, that is to say, the carboxyl group is not destroyed since acid or saponification values can be obtained. This acid group may also be esterified, neutralized or otherwise modified.

The heavy polymers produced by the methods indicated above may be added to lubricating oils in order to increase their film strength on the one hand, and to reduce pour point caused by the presence of waxy constituents. The polymers can be used in wax free oils if desired, but it is generally preferred to use the material in a waxy oil with a pour point of 30° or higher. A part of the wax, of course, may be removed if desired, and in the case of naturally low pour oils I have found it desirable even to add substantial quantities of wax along with the addition agent so as to improve the oil in regard to its viscosity-temperature curve and at the same time maintain a low pour point. For the present purpose the amount of polymer to be added is always below 10% and generally below even 5% depending on whether a more or less concentrated material may have been produced. If a heavy polymer having an average molecular weight of say 600 to 700 is produced by distilling off light fractions, then 1 to 4% is generally sufficient to materially increase the lubricating value of the oil and to reduce its pour point by some 30 to 50° F., and in this concentration the material does not greatly increase the viscosity of the oil with which it is blended. While many methods have been disclosed above, the preferred method is illustrated by the following examples in which the preferred materials and the most satisfactory conditions are used.

*Example 1*

Stearone, (di-heptadecyl-ketone)

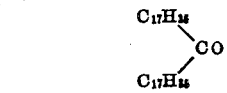

was prepared by the thermal decomposition (under high vacuum) of dry calcium stearate. The following reaction takes place:

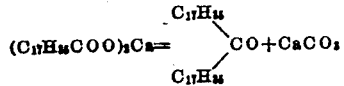

The stearone which forms as a result of the thermal decomposition distilled out from the reaction mixture and was collected in a separate receiver. The crude stearone was purified by first drying (distillation in xylene) and then removing all light boiling materials by distillation under high vacuum (5 mm. Hg pressure) to 250° C. The chief impurity removed by such a procedure was stearic acid. The residue of this distillation was the purified stearone used in the subsequent steps.

The stearone so prepared was found to be a light yellow waxy substance of high melting point (157° F.).

Seventy-five grams of stearone, prepared as described above, was chlorinated by passing chlorine gas into the molten stearone maintained at 210–230° F. Reaction with the chlorine gas was very rapid, 16.1 grams of chlorine being absorbed in 90 minutes. This corresponds to a chlorine content of 9.7%.

The following proportion of reagents were used:

|  | Grams |
|---|---|
| Chlorinated stearone | 75 |
| Naphthalene | 9.75 |
| AlCl₃ | 2.0 |

Seventy-five grams of this chlorinated stearone and 9.75 grams of naphthalene were dissolved in 150 cc. of tetrachlorethane and 2.0 grams AlCl₃ were added in two one-gram portions to the reaction mixture, while shaking at room temperature. The reaction mixture was then warmed to 140° F. for two hours and then diluted with 500 cc. of kerosene and neutralized by pouring into alcohol and water. After settling in a funnel, the kerosene extract was washed with water and then distilled with fire and steam to 600° F. to remove solvent and unreacted material. 31.8 grams of a viscous residue was then obtained, corresponding to a 43% yield based on the stearone.

The pour depressor potency of the stearone-naphthalene condensation product was tested by blending in a waxy petroleum lubricating oil. The following results were obtained:

|  | Pour point, °F. |
|---|---|
| Original oil | +30 |
| Original oil+1% stearone-naphthalene product | −5 |
| Original oil+3% stearone-naphthalene product | −5 |

It is interesting to note that 1% condensation of the material is as effective as 3%.

*Example 2*

A mixture of 75 grams of the chlorinated stearone described above and 10 grams of finely divided Attapulgus clay was heated slowly with stirring to 525° F. and was maintained at this temperature for two hours. Hydrogen chloride was evolved vigorously at first and the reaction mixture became very thick and viscous, the evolution of hydrogen chloride having practically ceased at the end of this time. The reaction mixture was then cooled to 120° F., was diluted with 500 cc. of kerosene and was filtered. The kerosene filtrate was distilled under a vacuum of 5 mm. mercury pressure absolute to 500° F. to remove the solvent and any unreacted materials. There was thus obtained as distillation residue 35 grams of a viscous polymer oil of high molecular weight.

1% of this polymer product was added to a waxy lubricating oil having a pour point of 30° F. The pour point of the resulting blend was −30° F.

Ethers may be used in place of the ketones in the above examples and polymer products having pour depressant properties may be similarly prepared therefrom.

The use of an alcohol as the long aliphatic oxygen-containing compound according to this invention is claimed in copending application Serial No. 67,369, filed March 5, 1936, now Patent 2,273,100.

In the following claims the term "polymer" is used to describe an effective combination of the initial materials of heavy molecular weight in substantial quantities, that is to say, with molecular weights above about 600 and ranging through 1000 to 2000. These heaviest materials cannot be vaporized or only with very great difficulty, without decomposition. It is to be understood that if the initial materials are saturated they must be rendered unsaturated or else must be halogenated, or if they are unsaturated originally they may be polymerized as such.

My invention is not to be limited by any theory of the operation of the condensation, nor to the use of any particular starting materials, but only to the claims in which I wish to claim all novelty inherent in the process.

I claim:

1. A product consisting essentially of a polymer-condensation product of an oxygen-containing aliphatic compound having an oxygen atom connected only to carbon and having a chain of more than ten carbon atoms, the polymer having a molecular weight above about 600 and soluble in a hydrocarbon oil and said polymer being substantially non-volatile under non-cracking distillation under reduced pressure substantially equivalent to distillation up to at least 475° F. under 1 millimeter vacuum.

2. An improved wax modifying agent consisting essentially of a polymer-condensation product having the property of lowering the pour point of a waxy mineral lubricating oil when added thereto in small amounts, and resulting from the reaction of an oxygen-containing aliphatic compound having an oxygen atom connected only to carbon and having an unsaturated chain of more than ten carbon atoms, with a compound of cyclic structure, the polymer having fractions with a molecular weight above about 600 and soluble in lubricating oils and said polymer being substantially non-volatile under non-cracking distillation under reduced pressure substantially equivalent to distillation up to at least 475° F. under 1 millimeter vacuum.

3. Product according to claim 2 in which the cyclic compound is an aromatic compound.

4. Product according to claim 2 in which the cyclic compound is naphthalene.

5. An improved wax modifying agent consisting essentially of a polymer-condensation product resulting from the reaction of a halogen-containing aliphatic compound having an oxygen atom connected only to carbon and having a chain of at least ten carbon atoms and a compound of cyclic structure, said polymer being soluble in lubricating oil and containing fractions having a molecular weight above 600 and said polymer being substantially non-volatile under non-cracking distillation under reduced pressure substantially equivalent to distillation up to at least 475° F. under 1 millimeter vacuum.

6. Composition according to claim 5 in which the said aliphatic compound is condensed with an aromatic hydrocarbon.

7. An improved wax modifying agent consisting essentially of a polymer-condensation product of a ketone containing a chain of more than 10 carbon atoms, the polymer having a molecular weight above about 600 and soluble in a hydrocarbon oil and said polymer being substantially non-volatile under non-cracking distillation under reduced pressure substantially equivalent to distillation up to at least 475° F. under 1 millimeter vacuum.

8. The process which comprises subjecting to a polymerization-condensation reaction an oxygen-containing aliphatic compound having an oxygen atom connected only to carbon and having a chain of more than 10 carbon atoms, to produce a polymer-condensation product having a molecular weight of above about 600 and soluble in a hydrocarbon oil, and subjecting the reaction products to a non-cracking distillation under reduced pressure substantially equivalent to distillation up to at least 475° F. under 1 millimeter vacuum, to recover the desired polymer-condensation product as distillation residue.

9. Process according to claim 8 in which a cyclic compound is present and enters into the reaction.

10. Process according to claim 8 in which the oxygen-containing aliphatic compound is a ketone.

11. Process according to claim 8 carried out at a temperature of about 70°–300° F.

12. Process according to claim 8 carried out in the presence of a Friedel-Crafts condensing agent.

13. The process which comprises subjecting an aliphatic compound selected from the group consisting of ketones and ethers having a carbon chain of at least 10 carbon atoms to a polymerization-condensation reaction with an aromatic compound at a temperature of about 70°–300° F. in the presence of an inert solvent and in the presence of a condensing agent of the class of aluminum chloride, zinc chloride and boron fluoride, to produce a polymer-condensation product having a molecular weight of about 600, having wax modifying properties and soluble in a hydrocarbon lubricating oil, and subjecting the reaction products to a non-cracking distillation under reduced pressure substantially equivalent to distillation up to at least 475° F. under 1 millimeter vacuum, to recover the desired polymer-condensation product as distillation residue.

14. The process which comprises chlorinating stearone, dissolving about 75 parts by weight of the resultant chlorinated stearone and about 9.7 parts by weight of naphthalene in tetrachlorethane as an inert solvent, adding about 2.0 grams of aluminum chloride with stearone at about room temperature, warming the reaction mixture to about 140° F. for about two hours, diluting the reaction mixture with kerosene, pouring the reaction mixture into alcohol and water, settling the mixture, washing the kerosene extract with water and distilling the washed extracts with steam to about 600° F. to remove a solvent and unreacted material, whereby a viscous polymer-condensation residue is obtained having a molecular weight above about 600° F., soluble in mineral lubricating oil and having pour-depressing properties when added to a waxy petroleum lubricating oil.

15. A polymer-condensation product of a chlorinated aliphatic ketone containing a chain of more than 10 carbon atoms, said product having a molecular weight above about 600, having the property of reducing the pour point of waxy mineral lubricating oils when added thereto in small amounts, being soluble in a hydrocarbon oil and being substantially non-volatile under a non-cracking distillation under reduced pressure substantially equivalent to distillation up to at least about 500° F. under 5 millimeter vacuum.

16. Condensation product of a chlorinated aliphatic ketone containing a chain of more than 10 carbon atoms, and an aromatic compound, said condensation product having a molecular weight above about 600, having the property of reducing the pour point of waxy mineral lubricating oils when added thereto in small amounts, being soluble in a hydrocarbon oil and being substantially non-volatile under a non-cracking distillation under reduced pressure substantially equivalent to distillation up to at least 475° F. under 1 millimeter vacuum.

17. Condensation product of a chlorinated aliphatic ketone containing a chain of more than 10 carbon atoms, and naphthalene, said condensation product having a molecular weight above about 600, having the property of reducing the pour point of waxy mineral lubricating oils when added thereto in small amounts, being soluble in a hydrocarbon oil and being substantially non-volatile under a non-cracking distillation under reduced pressure substantially equivalent to steam distillation up to about 600° F.

ANTHONY H. GLEASON.